US012486714B2

(12) United States Patent
Liang et al.

(10) Patent No.: US 12,486,714 B2
(45) Date of Patent: Dec. 2, 2025

(54) CORD DIVIDER FOR CORD WINDER OF WINDOW CURTAINS

(71) Applicant: CHING FENG HOME FASHIONS CO., LTD., Changhua County (TW)

(72) Inventors: Wen Ying Liang, Changhua County (TW); Sheng Ying Hsu, Changhua County (TW); Chien Chih Huang, Changhua County (TW); Wu Chung Nien, Changhua County (TW); Ming Chu Chiang, Changhua County (TW); Wei Ming Shih, Changhua County (TW)

(73) Assignee: CHING FENG HOME FASHIONS CO., LTD., Changhua County (TW)

( * ) Notice: Subject to any disclaimer, the term of this patent is extended or adjusted under 35 U.S.C. 154(b) by 232 days.

(21) Appl. No.: 18/221,314

(22) Filed: Jul. 12, 2023

(65) Prior Publication Data

US 2024/0360720 A1 Oct. 31, 2024

(30) Foreign Application Priority Data

Apr. 28, 2023 (TW) ................................ 112116023

(51) Int. Cl.
*E06B 9/322* (2006.01)

(52) U.S. Cl.
CPC ...... *E06B 9/322* (2013.01); *E06B 2009/3225* (2013.01)

(58) Field of Classification Search
CPC ..... E06B 2009/3222; E06B 2009/3225; E06B 9/322
See application file for complete search history.

(56) References Cited

U.S. PATENT DOCUMENTS

| | | | | |
|---|---|---|---|---|
| 6,761,203 B1 * | 7/2004 | Huang | E06B 9/322 | 160/192 |
| 8,863,812 B2 * | 10/2014 | Lin | E06B 9/322 | 160/84.05 |
| 8,925,615 B2 * | 1/2015 | Lin | E06B 9/322 | 160/170 |
| 9,272,875 B2 * | 3/2016 | Lin | E06B 9/322 | |
| 9,297,203 B2 * | 3/2016 | Hsueh-Cheng | E06B 9/322 | |
| 9,366,076 B2 * | 6/2016 | Hung | E06B 9/322 | |
| 9,366,077 B2 * | 6/2016 | Chen | E06B 9/322 | |
| 9,482,049 B2 * | 11/2016 | Chen | E06B 9/322 | |
| 9,587,428 B2 * | 3/2017 | Huang | E06B 9/322 | |
| 9,714,538 B2 * | 7/2017 | Huang | E06B 9/38 | |
| 9,797,189 B2 * | 10/2017 | Huang | E06B 9/262 | |
| 9,845,639 B2 * | 12/2017 | Chen | E06B 9/322 | |
| 9,874,057 B2 * | 1/2018 | Huang | E06B 9/322 | |

(Continued)

*Primary Examiner* — Johnnie A. Shablack
(74) *Attorney, Agent, or Firm* — Che-Yang Chen; Law Office of Michael Chen

(57) ABSTRACT

A cord divider is positioned on both sides of the cord winder of the control box of a cordless window curtain. Each cord divider is equipped with protrusions and crosspieces. When the cords are pulled out from the cord divider, the cords do not tangle or knot. The cords are wound up on the driving gear set, and the driving cord device prevents the cords from overlapping and causing uneven heights on both sides of the curtain. The use of cylinders in the cord dividers prevents excessive friction of the cords during use. There is no need to change the current cooperation way between the cords and the cord winder.

4 Claims, 5 Drawing Sheets

(56) References Cited

U.S. PATENT DOCUMENTS

| | | | | | |
|---|---|---|---|---|---|
| 9,963,933 | B2 * | 5/2018 | Chen | E06B 9/303 | |
| 10,273,748 | B2 * | 4/2019 | Chen | E06B 9/322 | |
| 10,480,244 | B2 * | 11/2019 | Chen | E06B 9/42 | |
| 10,612,299 | B2 * | 4/2020 | Chen | B65H 75/4492 | |
| 10,641,039 | B2 * | 5/2020 | Chen | E06B 9/322 | |
| 10,704,323 | B2 * | 7/2020 | Chen | E06B 9/322 | |
| 10,704,658 | B2 * | 7/2020 | Chen | F16H 19/0672 | |
| 10,731,409 | B2 * | 8/2020 | Chen | E06B 9/323 | |
| 10,822,870 | B2 * | 11/2020 | Chen | E06B 9/322 | |
| 10,822,871 | B2 * | 11/2020 | Chen | E06B 9/322 | |
| 10,865,600 | B2 * | 12/2020 | Zhang | E06B 9/307 | |
| 10,982,488 | B2 * | 4/2021 | Chen | B65H 75/486 | |
| 10,995,545 | B2 * | 5/2021 | Chen | E06B 9/364 | |
| 11,047,172 | B2 * | 6/2021 | Huang | E06B 9/322 | |
| 11,072,975 | B2 * | 7/2021 | Chen | E06B 9/322 | |
| 11,261,655 | B2 * | 3/2022 | Huang | E06B 9/322 | |
| 11,459,819 | B2 * | 10/2022 | Liu | B65H 75/486 | |
| 11,473,370 | B2 * | 10/2022 | Chen | E06B 9/322 | |
| 11,549,308 | B2 * | 1/2023 | Luo | E06B 9/384 | |
| 12,098,593 | B2 * | 9/2024 | Chen | E06B 9/322 | |
| 2010/0206492 | A1 * | 8/2010 | Shevick | E06B 9/30 | 160/170 |
| 2014/0291431 | A1 * | 10/2014 | Huang | E06B 9/322 | 242/372 |
| 2015/0129142 | A1 * | 5/2015 | Huang | E06B 9/322 | 160/370 |
| 2016/0298385 | A1 * | 10/2016 | Chen | E06B 9/322 | |
| 2017/0107075 | A1 * | 4/2017 | Hung | E06B 9/322 | |
| 2017/0298688 | A1 * | 10/2017 | Chen | E06B 9/322 | |
| 2018/0202220 | A1 * | 7/2018 | Huang | E06B 9/322 | |
| 2018/0291678 | A1 * | 10/2018 | Zheng | E06B 9/322 | |
| 2018/0291679 | A1 * | 10/2018 | Zheng | E06B 9/322 | |
| 2018/0313143 | A1 * | 11/2018 | Chang | E06B 9/322 | |
| 2019/0063147 | A1 * | 2/2019 | Cheng | E06B 9/322 | |
| 2020/0040655 | A1 * | 2/2020 | Chen | B65H 75/446 | |
| 2020/0180902 | A1 * | 6/2020 | Zheng | B65H 75/486 | |
| 2020/0399955 | A1 * | 12/2020 | Chen | E06B 9/322 | |
| 2021/0079722 | A1 * | 3/2021 | Liang | E06B 9/322 | |
| 2021/0254400 | A1 * | 8/2021 | Lin | E06B 9/322 | |
| 2024/0360720 | A1 * | 10/2024 | Liang | E06B 9/262 | |

* cited by examiner

CORD DIVIDER FOR CORD WINDER OF WINDOW CURTAINS

FIELD OF THE INVENTION

The present invention relates to a cord divider which is installed to a cord winder of a cordless window curtain to guide and divide the cords so that the cords do not tangle or knot.

BACKGROUND OF THE INVENTION

The common cord winder for window curtains typically involves winding the cords around interlocking driving gears, and the cords are pulled out from the cord winder and pass through the upper beam and curtain body, and are fixed to the lower beam. However, since each cord is positioned on adjacent driving gear sets, and these gear sets are separated into upper and lower winding structures by a ring-shaped partition, during operation, the cord is prone to mutual interference and knotting issues. This can result in uneven release of the curtain or even the cord getting entangled and stuck, necessitating the replacement of both the cord and the cord winder.

The invention described in Taiwan Patent No. 1636755B and U.S. Pat. No. 10,641,039 relates to the cord dividers for a curtain cord winder. By installing a cord divider at the front and back ends of the cord winder, it can prevent the cord from tangling and knotting during operation.

The above-mentioned product indeed solves the problem of cord entanglement and knotting. However, it has the following drawbacks in practical use:

The cord is directly pulled out from the threading hole of the cord divider, causing friction on the cord, which may result in breakage during use.

As is well known, the cord winder primarily relies on the precise control of the tension between the driving gear set and the cord to control the lifting position of the curtain. However, in the previous case, the tension of the cord is not controlled, requiring multiple adjustments of the curtain to reach the desired position.

When the cord winder and cord dividers in the case are applied to large curtains, there are two opposing cords that need to bypass the outside of the cord winder due to the placement of the cord dividers at the front and back ends. This leads to a more complex wiring configuration.

Moreover, although the same driving gear rotates in the same direction, the cord is pulled out from both ends, resulting in inconsistent friction forces between the two cords. This causes the curtain to tilt unpredictably in different directions.

Overall, while the previous invention addresses the issue of cord entanglement and knotting, it presents several disadvantages regarding cord durability, tension control, complex wiring, and uneven curtain alignment.

The present invention intends to provide a cord divider to eliminate the shortcomings mentioned above.

SUMMARY OF THE INVENTION

The present invention relates to a control device of cordless window curtains comprises a cord winder which comprises a frame to which a first spring wheel, a second spring wheel, a first gear and a second gear are installed. Two first cords are wrapped around the first gear, and two second cords are wrapped around the second gear. Multiple posts are connected to the frame. Two cord dividers are respectively connected to two sides of the frame and each cord divider includes a body, a crosspiece formed to the body, and a protrusion protruding from one side of the body. A cylinder is connected to the body of each of the cord dividers, and a fixing rod extends through the crosspiece of each of the cord dividers to connect the divider to the frame of the cord winder. The first two cords extend out from the frame and go through a gap between the protrusion of one of the two cord dividers, and extends through an upper beam, a curtain body and is fixed to a lower beam. The crosspiece of the cord divider is located between the two first cords. The two second cords extend out from the frame and go through a gap between the protrusion of another one of the two cord dividers and extend through the upper beam, the curtain body and are fixed to the lower beam. The crosspiece of the cord divider is located between the two second cords.

The primary object of the present invention is to provide a cord divider which is connected to each of two sides of the frame of the cord winder. The cord divider includes a crosspiece which is located between the two first cords and the second cords so as to guide the cords which do not tangle and knot.

The advantages of the present invention are that the first and second cords slide along the outer surface of the cylinders so that the friction is minimized and the first and second cords can be operated smoothly.

The cord dividers are respectively located at two sides of the frame of the cord winder so that the current way of installation of the first and second cords does not need to be changed.

The present invention will become more obvious from the following description when taken in connection with the accompanying drawings which show, for purposes of illustration only, a preferred embodiment in according with the present invention.

DETAILED DESCRIPTION OF THE PREFERRED EMBODIMENT

Figure 1:
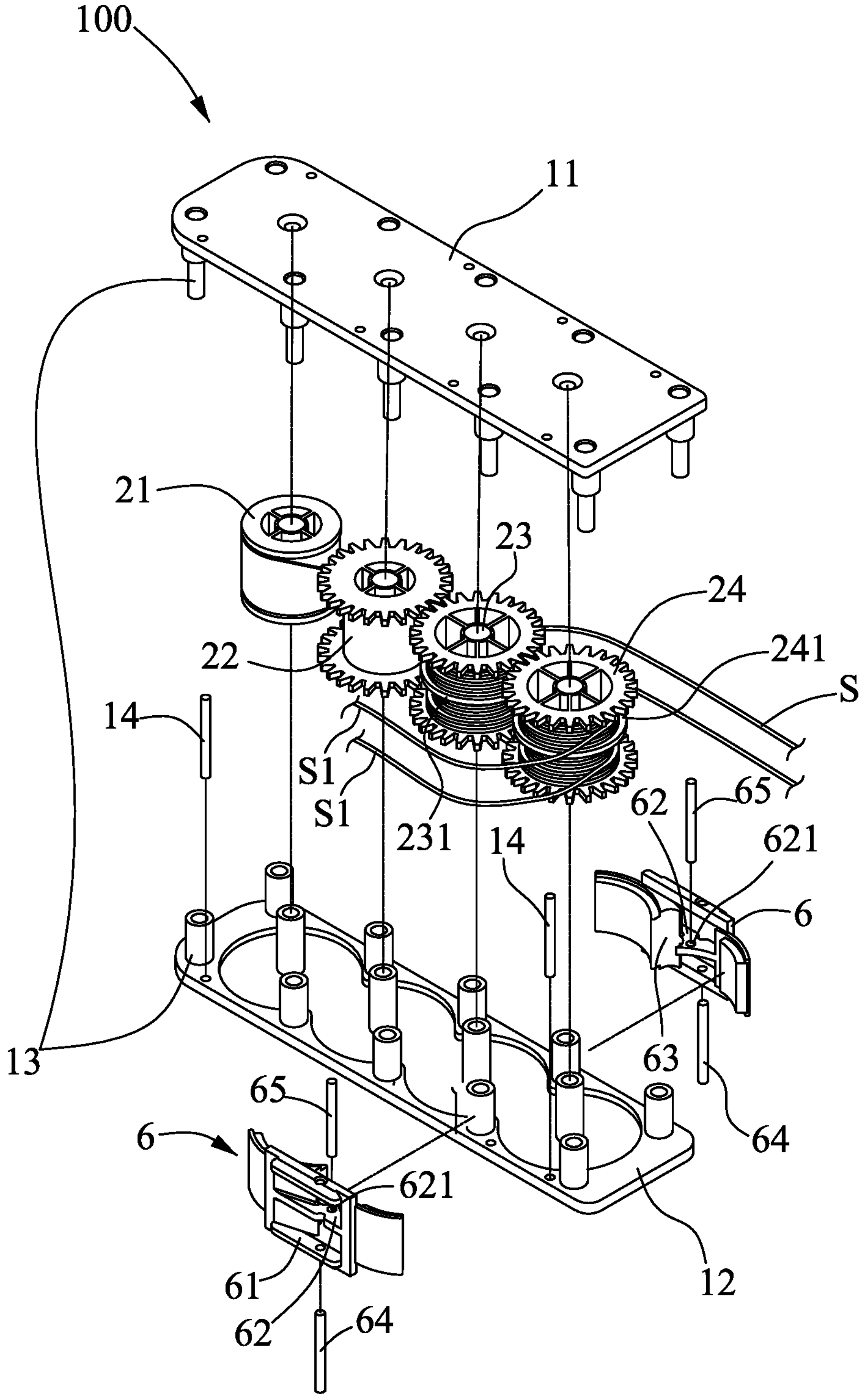
FIG. 1 is an exploded view to show the cord winder of the present invention.
Figure 2:
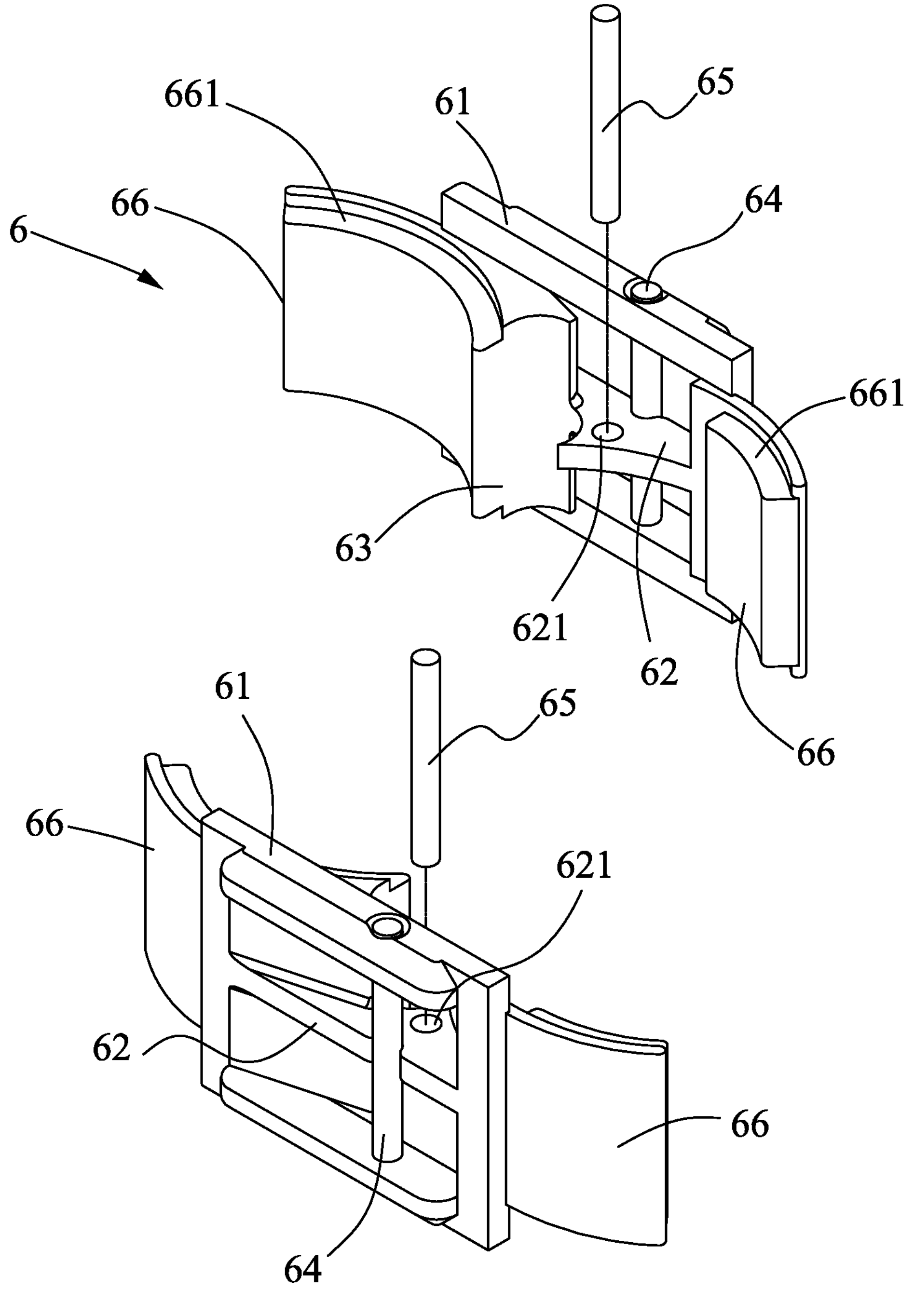
FIG. 2 is a perspective view to show the cord divider of the present invention.
Figure 3:
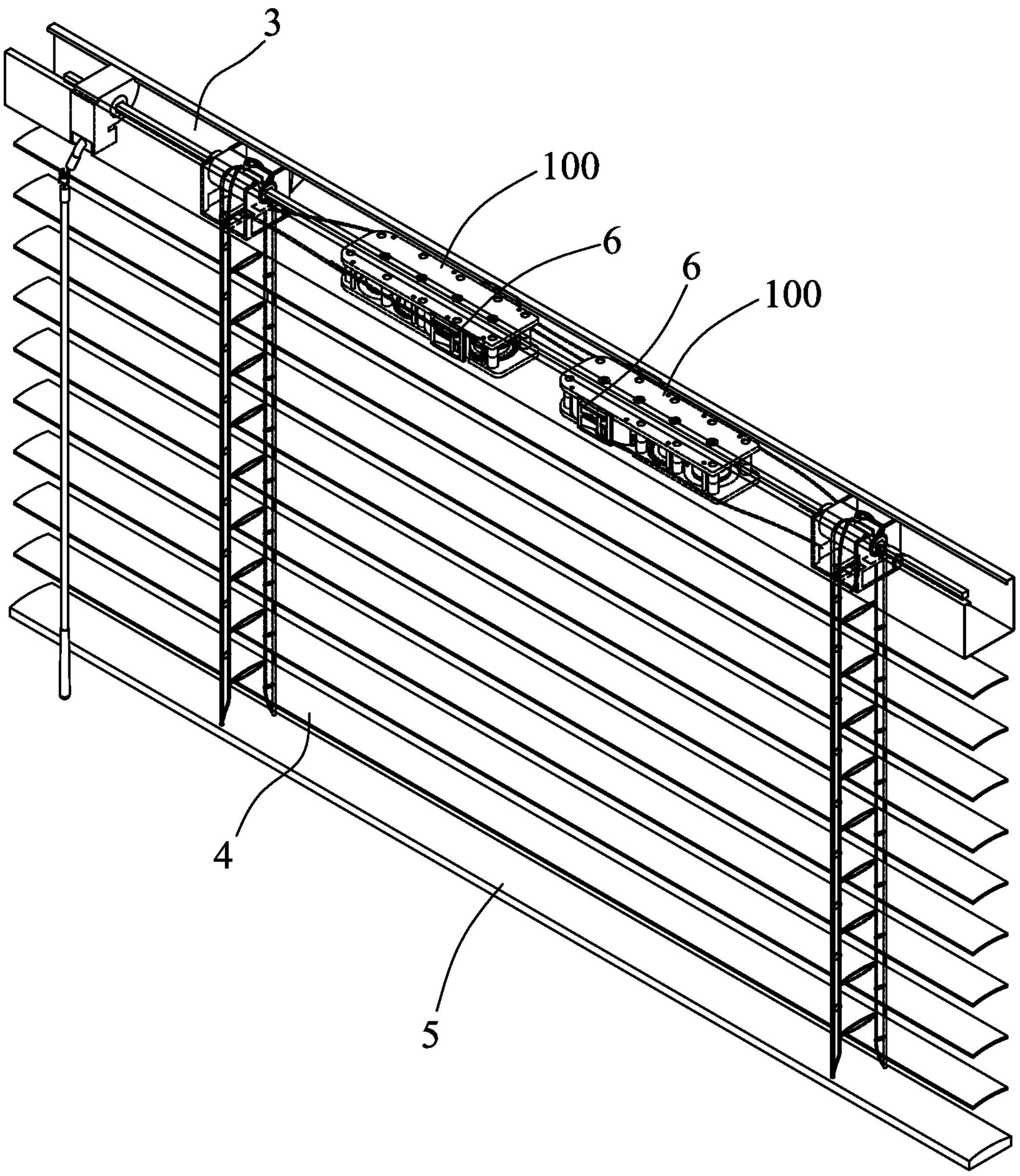
FIG. 3 shows that the cord dividers are connected to the cord winders of a cordless window curtain.
Figure 4A:
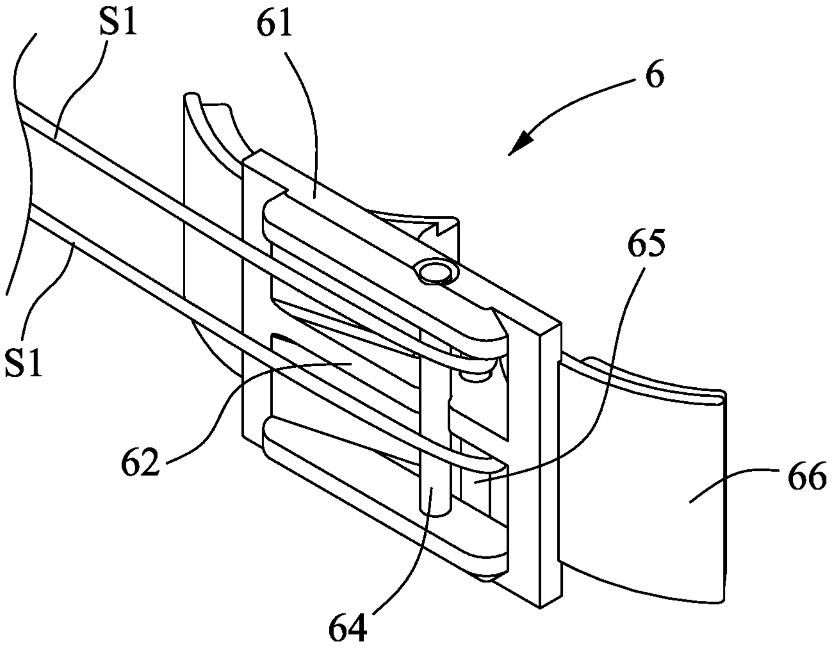
FIG. 4A shows that two second cords are divided by the crosspiece of the cord divider.
Figure 4B:
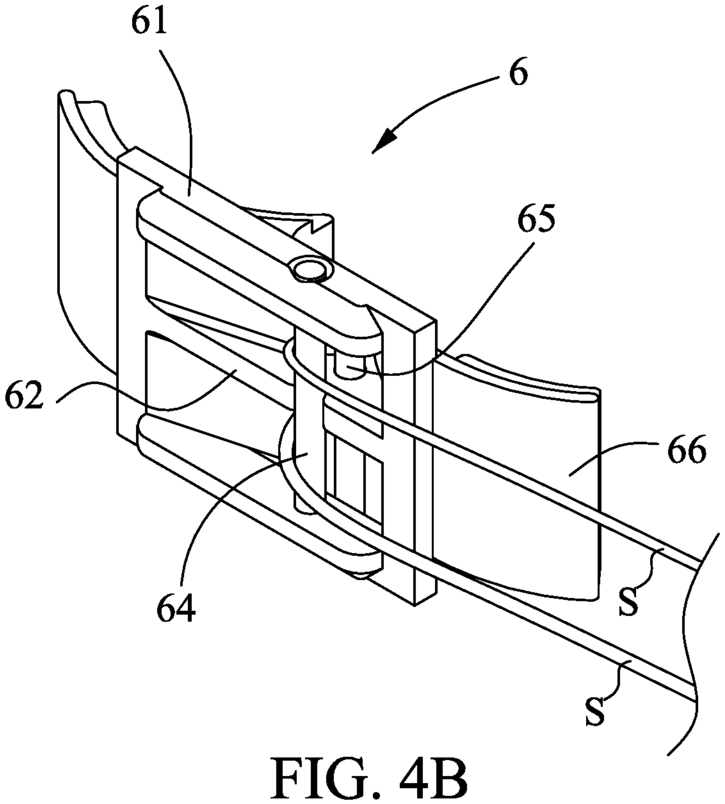
FIG. 4B shows that two first cords are divided by the crosspiece of the cord divider.
Figure 5:
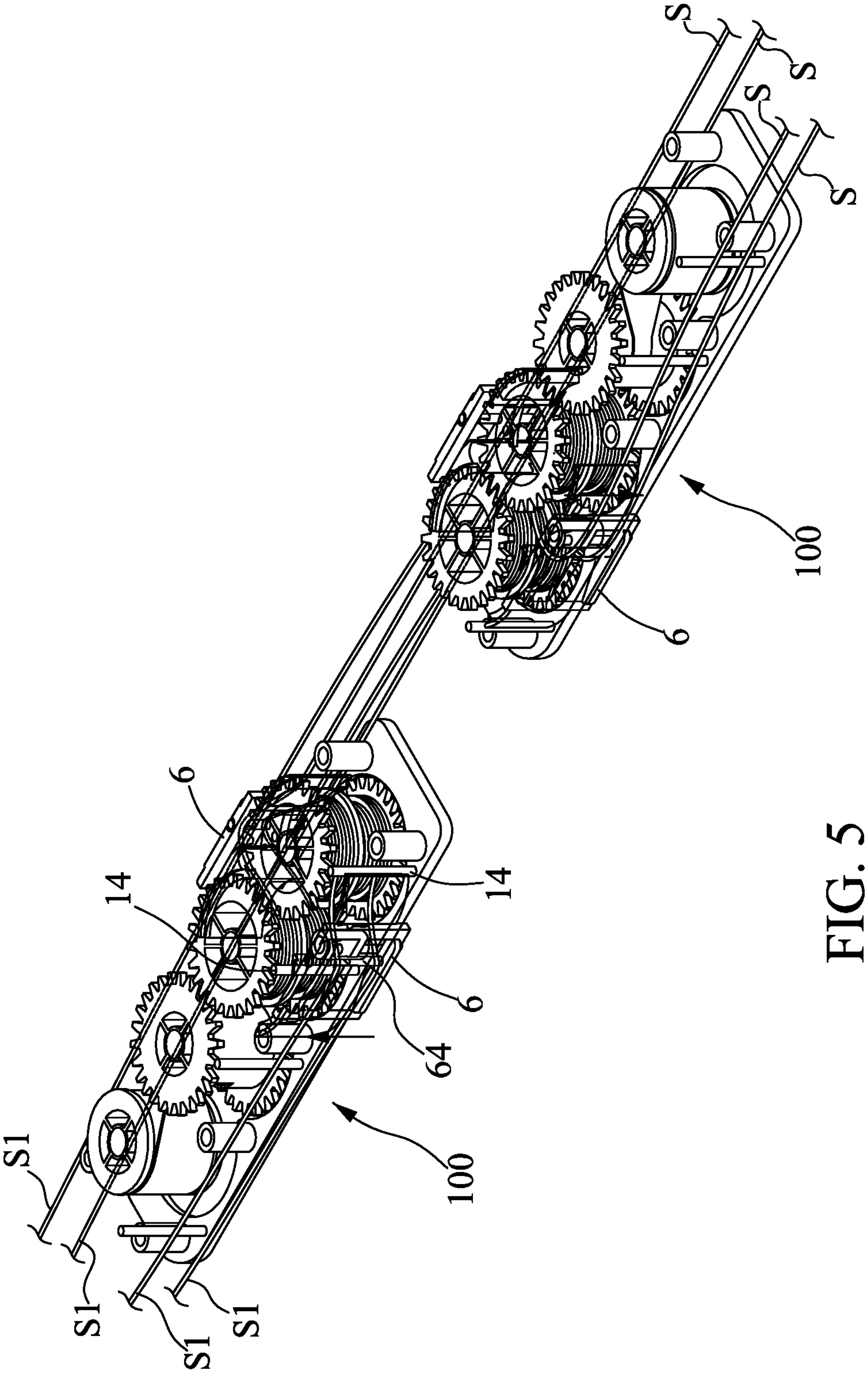
FIG. 5 is an enlarged view to show the two cord winders are used to a cordless window curtain.

Referring to FIGS. 1, 2, 3, 4A, 4B and 5, the control device of cordless window curtains of the present invention comprises a cord winder 100 which includes a frame, and the frame dis composed of a top part 11 and a bottom part 12 which is connected to the top part 11 by multiple connections 13. A first spring wheel 21, a second spring wheel 22, a first gear 23 and a second gear 24 are installed to the frame. Two first cords "S" are wrapped around the first gear 23, and two second cords "S1" wrapped around the second gear 24. Multiple posts 14 are connected between the top part 11 and the bottom part 12 of each frame.

Two cord dividers 6 are respectively connected to two sides of the frame and each cord divider 6 includes a body 61, a crosspiece 62 formed to the body 61, and a protrusion 63 protruding from one side of the body 61. A cylinder 64 is connected to the body 61 of each of the cord dividers 6 and located perpendicular to the crosspiece 62. A fixing rod 65 extends through the hole 621 defined through the crosspiece 62 of each of the cord dividers 6 so as to connect the cord divider 6 to the frame of the cord winder 100. the first two cords S extend out from the frame and go through a gap between the protrusion 63 of one of the two cord dividers 6, and extend through an upper beam 3, a curtain body 4 and fixed to a lower beam 5. The crosspiece 62 of the cord divider 6 is located between the two first cords S. The two second cords S1 extend out from the frame and go through a gap between the protrusion 63 of another one of the two cord dividers 6 and extend through the upper beam 3, the curtain body 4 and fixed to the lower beam 5. The crosspiece 62 of cord divider 6 is located between the two second cords S1. In this embodiment, for each cord divider 6, an upper space and a bottom space are divided by the crosspiece 62, and the first cords S or the second cords S1 extend through the upper space and the bottom space of the cord divider 6 corresponding thereto. Each of the first and second cords S, S1 slides along the outer surface of the cylinder 64 corresponding thereto to lift or lower the curtain body 4.

The first gear 23 includes a first flange 231 extending radially outward therefrom, and the second gear 24 includes a second flange 241 extending radially outward therefrom. The first flange 231 is located between the two first cords S wrapped to the first gear 23, and the second flange 241 is located between the two second cords S1 wrapped to the second gear 24. The protrusion 63 of each of the cord dividers 6 is located between the first and second flanges 231, 241. The width of a space between the first and second flanges 231, 241 and the protrusion 63 is less than the diameter of each of the first and second cords, S, S1. By this arrangement, the first and second cords S, S1 do not slip through the space to affect the other first and second cords S, S1 during operation to cause the curtain body 4 to be tilt.

The body 61 of each of the cord dividers 6 includes two curved plates 66 respectively extending from two ends thereof. One of the two curved plates 66 is located to cover the first gear 23 and the first flange 231, and another one of the two curved plates 66 is located to cover the second gear 24 and the second flange 241. These curved plates 66 prevent the first cords S and the second cords S1 from moving away from the first gear 23 and the second gear 24 during wrapping action. The first and second cords S, S1 go above or below the crosspiece 62 of the cord divider 6 corresponding thereto so that the first and second cords S, S1 are well organized and do not interfere with each other. The inside of the curved plates 66 also prevent the first and second cords S, S1 from jumping over the first and second flanges 231, 241 to affect the other first and second cords S, S1. Each of the curved plates 66 includes a stepped portion 661 defined in the inside that faces the first gear 23 and the second gear 24, the stepped portion 661 of the two curved plates accommodate a portion of the first gear 23 and a portion of the second gear 24.

The first spring wheel 21 and the second spring gear 22 provide a spring force to drive the first gear 23 and the second gear 24 to operate the first cords S and the second cords S1 to lift or lower the curtain body 4. Of course, for a small-sized window curtain, only one cord winder 100 is needed, and only one first cord S extends through the one of the two cord dividers 6 on one of two sides of the cord winder 100, and only one second cord S1 extends through another one of the two cord dividers 6 on another one of the two sides of the cord winder 100.

While we have shown and described the embodiment in accordance with the present invention, it should be clear to those skilled in the art that further embodiments may be made without departing from the scope of the present invention.

What is claimed is:

1. A control device of cordless window curtains, comprising:

a cord winder including a frame to which a first spring wheel, a second spring wheel, a first gear and a second gear are installed, two first cords wrapped around the first gear, two second cords wrapped around the second gear, multiple posts connected to the frame, and two cord dividers respectively connected to two sides of the frame and each cord divider including a body, a crosspiece formed to the body, and a protrusion protruding from one side of the body, a cylinder connected to the body of each of the cord dividers, a fixing rod extending through the body of each of the cord dividers to connect the divider to the frame of the cord winder, the two first cords extending out from the frame and going through a gap between the protrusion of one of the two cord dividers, and extending through an upper beam, a curtain body and fixed to a lower beam, the crosspiece of the cord divider located between the two first cords, the two second cords extending out from the frame and going through a gap between the protrusion of another one of the two cord dividers and extending through the upper beam, the curtain body and fixed to the lower beam, the crosspiece of the cord divider located between the two second cords, the first gear including a first flange extending radially outward therefrom, the second gear including a second flange extending radially outward therefrom, the first flange located between the two first cords wrapped to the first gear, the second flange located between the two second cords wrapped to the second gear, the protrusion of each of the cord dividers located between the first and second flanges, a width of a space between the first and second flanges and the protrusion less than a diameter of each of the first and second cords.

2. The control device of cordless window curtains as claimed in claim 1, wherein each of the first and second cords slides along an outer surface of the cylinder corresponding thereto to lift or lower a curtain body.

3. The control device of cordless window curtains as claimed in claim 1, wherein the body of each of the cord dividers includes two curved plates respectively extending from two ends thereof, one of the two curved plates is located to cover the first gear and the first flange, another one of the two curved plates is located to cover the second gear and the second flange.

4. The control device of cordless window curtains as claimed in claim 3, wherein each of the curved plates includes a stepped portion defined in an inside that faces the first gear and the accommodate gear, the stepped portion of the two curved plates accommodate a portion of the first gear and a portion of the second gear.

* * * * *